(12) United States Patent
Traidia et al.

(10) Patent No.: US 11,754,215 B2
(45) Date of Patent: Sep. 12, 2023

(54) APPARATUS AND METHOD FOR FRICTION WELDING OF REINFORCED THERMOSETTING RESIN PIPE JOINTS

(71) Applicants: SAUDI ARABIAN OIL COMPANY, Dhahran (SA); TWI Ltd., Cambridge (GB)

(72) Inventors: Abderrazak Traidia, Lussan (FR); Abdullah Al Shahrani, Dammam (SA); Chris Worrall, Cambridge (GB); Farshad Salamat-Zadeh, Cambridge (GB); Waleed Al Nasser, Ad Dammam (SA)

(73) Assignees: SAUDI ARABIAN OIL COMPANY, Dhahran (SA); SAUDI ARAMCO TECHNOLOGIES COMPANY, Dhahran (SA)

( * ) Notice: Subject to any disclaimer, the term of this patent is extended or adjusted under 35 U.S.C. 154(b) by 0 days.

(21) Appl. No.: 17/380,885

(22) Filed: Jul. 20, 2021

(65) Prior Publication Data
US 2022/0018478 A1  Jan. 20, 2022

Related U.S. Application Data

(60) Provisional application No. 63/053,924, filed on Jul. 20, 2020.

(51) Int. Cl.
*B29C 65/06* (2006.01)
*F16L 47/02* (2006.01)
(Continued)

(52) U.S. Cl.
CPC .......... *F16L 47/02* (2013.01); *B29C 65/0672* (2013.01); *B29C 66/5221* (2013.01);
(Continued)

(58) Field of Classification Search
CPC ...... F16L 47/02; F16L 47/16; B29C 65/0672; B29C 66/5221; B29C 66/71; B29C 66/73921
(Continued)

(56) References Cited

U.S. PATENT DOCUMENTS

| 170,473 A | 11/1875 | Flagler et al. |
| 2,559,806 A | 7/1951 | Thompson |

(Continued)

FOREIGN PATENT DOCUMENTS

| CA | 2116083 A1 | 8/1994 |
| CN | 1086763 A | 5/1994 |

(Continued)

OTHER PUBLICATIONS

International Search Report and Written Opinion of the International Searching Authority issued in corresponding International Application No. PCT/US2021/042330, dated Oct. 15, 2021 (24 pages).

(Continued)

*Primary Examiner* — James D Sells
(74) *Attorney, Agent, or Firm* — Osha Bergman Watanabe & Burton LLP

(57) ABSTRACT

A system for coupling pipes includes a first pipe having a tapered, spigot end; a second pipe having a tapered, spigot end; and a coupler having two tapered socket ends adapted to internally receive the respective tapered, spigot ends of the first pipe and the second pipe. the first pipe and the second pipe are made from a reinforced thermosetting resin (RTR). A thermoplastic material is disposed between an exterior of the first pipe and an interior of the coupler. A thermoplastic material is disposed between an exterior of the second pipe and the interior of the coupler. Upon application of rotational force to the coupler, friction between the first (Continued)

pipe, the second pipe, and the coupler generates heat sufficient to melt the thermoplastic material such that, when the heat is removed, the hardened thermoplastic material seals the first pipe and the second pipe to the coupler. A method for coupling pipes includes disposing a thermoplastic material between an exterior of the first pipe and an interior of the coupler; disposing a thermoplastic material between an exterior of the second and an interior of the coupler; inserting the first pipe and the second pipe into the coupler; and applying a rotational force to the coupler such that friction between the first pipe, the second pipe, and the coupler generates heat sufficient to melt the thermoplastic material such that, when the heat is removed, the hardened thermoplastic material seals the first pipe and the second pipe to the coupler.

8 Claims, 4 Drawing Sheets

(51) Int. Cl.
　　　*B29C 65/00*　　　(2006.01)
　　　*F16L 47/16*　　　(2006.01)
　　　*B29K 105/06*　　　(2006.01)
　　　*B29L 23/00*　　　(2006.01)
(52) U.S. Cl.
　　　CPC ........ *B29C 66/71* (2013.01); *B29C 66/73921* (2013.01); *F16L 47/16* (2013.01); *B29K 2105/06* (2013.01); *B29L 2023/22* (2013.01)
(58) Field of Classification Search
　　　USPC ........................................................ 156/73.5
　　　See application file for complete search history.

(56) References Cited

U.S. PATENT DOCUMENTS

| | | | |
|---|---|---|---|
| 2,958,906 | A | 11/1960 | Youthed |
| 3,002,871 | A | 10/1961 | Tramm et al. |
| 3,061,503 | A | 10/1962 | Gould et al. |
| 3,307,997 | A | 3/1967 | Detrick |
| 3,506,519 | A | 4/1970 | Blumenkranz |
| 3,946,761 | A | 3/1976 | Thompson et al. |
| 4,090,899 | A | 5/1978 | Reich |
| 4,530,521 | A | 7/1985 | Nyffeler et al. |
| 4,662,655 | A | 5/1987 | Fliervoet et al. |
| 4,865,674 | A | 9/1989 | Durkin |
| 5,106,130 | A | 4/1992 | Ellsworth et al. |
| 5,152,855 | A | 10/1992 | Jansman et al. |
| 5,186,500 | A | 2/1993 | Folkers |
| 5,213,379 | A | 5/1993 | Taniguchi et al. |
| 5,264,059 | A | 11/1993 | Jacaruso et al. |
| 5,758,731 | A | 6/1998 | Zollinger |
| 5,785,092 | A | 7/1998 | Friedrich et al. |
| 6,131,954 | A | 10/2000 | Campbell |
| 6,521,072 | B1 | 2/2003 | Campbell |
| 7,240,697 | B2 | 7/2007 | Beebe et al. |
| 8,424,924 | B2 | 4/2013 | LaMarca et al. |
| 8,522,827 | B2 | 9/2013 | Lazzara et al. |
| 8,746,747 | B2 | 6/2014 | McPherson |
| 9,285,063 | B2 | 3/2016 | Jones |
| 9,358,764 | B2 | 6/2016 | Prebil et al. |
| 9,523,447 | B2 | 12/2016 | Conrad |
| 9,528,638 | B2 * | 12/2016 | Hooberman ........ B29C 66/1224 |
| 9,534,719 | B2 | 1/2017 | Eccleston et al. |
| 9,810,359 | B2 | 11/2017 | Spears et al. |
| 2004/0222627 | A1 | 11/2004 | Krah |
| 2006/0279084 | A1 | 12/2006 | Collins |
| 2009/0277579 | A1 | 11/2009 | Marelli et al. |
| 2013/0036604 | A1 | 2/2013 | Schmidt et al. |
| 2013/0140811 | A1 | 6/2013 | Fahrer et al. |
| 2013/0175797 | A1 | 7/2013 | Kanao |
| 2014/0137971 | A1 | 5/2014 | Lundman |
| 2014/0220356 | A1 | 8/2014 | Van Tooren |
| 2014/0363220 | A1 | 12/2014 | Auer et al. |
| 2014/0375047 | A1 | 12/2014 | Jones |
| 2019/0128458 | A1 | 5/2019 | Kimball et al. |

FOREIGN PATENT DOCUMENTS

| | | |
|---|---|---|
| CN | 1263977 C | 7/2006 |
| CN | 104708890 B | 12/2018 |
| CN | 110131511 A | 8/2019 |
| CN | 110823481 A | 2/2020 |
| DE | 939719 C | 3/1956 |
| DE | 199 11 284 A1 | 9/2000 |
| EP | 0382593 A2 | 8/1990 |
| EP | 3717736 B1 | 3/2022 |
| GB | 775233 A | 5/1957 |
| GB | 1 329 364 A | 9/1973 |
| GB | 2033394 A | 5/1980 |
| GB | 2 271 958 A | 5/1994 |
| GB | 2425337 A | 10/2006 |
| JP | H10-281383 A | 10/1998 |
| JP | 2002-295780 A | 10/2002 |
| JP | 2003-130276 A | 5/2003 |
| JP | 2009018576 A | 1/2009 |
| WO | 96/26380 A1 | 8/1996 |
| WO | 00/55538 A1 | 9/2000 |
| WO | 2005025836 A1 | 3/2005 |
| WO | 2008028224 A1 | 3/2008 |
| WO | 2009/007537 A1 | 1/2009 |
| WO | 2010033163 A2 | 3/2010 |
| WO | 2012137197 A2 | 10/2012 |
| WO | 2020/007924 A1 | 1/2020 |

OTHER PUBLICATIONS

International Search Report and Written Opinion of the International Searching Authority issued in corresponding International Application No. PCT/US2021/042296, dated Oct. 14, 2021 (14 pages).

International Search Report and Written Opinion of the International Searching Authority issued in corresponding International Application No. PCT/US2021/042308, dated Oct. 15, 2021 (14 pages).

Van Moorleghem, Régis, "Welding of thermoplastic to thermoset composites through a thermoplastic interlayer"; TUDelft: Delft University of Technology; Jun. 2, 2016; <http://resolver.tudelft.nl/uuid:821d5aaf-99a8-4fc7-a32d-eadb5d104aa9>; Accessed Jun. 16, 2020 (67 pages).

Villegas, Irene Fernandez et al., "Ultrasonic welding of carbon/epoxy and carbon/PEEK composites through a PEI thermoplastic coupling layer"; Composites Part A: Applied Science and Manufacturing; vol. 109; pp. 75-83; Jun. 2018; <https://doi.org/10.1016/j.compositesa.2018.02.022> (32 pages).

Hamade, Ramsey F. et al., "Rotary Friction Welding versus Fusion Butt Welding of Plastic Pipes—Feasibility and Energy Perspective"; Procedia Manufacturing; vol. 33; pp. 693-700; 2019 (8 pages).

Beiss, T. et al., "Vibration Joining of Fiber-Reinforced Termosets"; Polymer COMPOSITES; vol. 31, Issue 7; pp. 1205-1212; Jul. 2010 (8 pages).

Yousefpour, Ali et al., "Fusion Bonding/Welding of Thermoplastic Composites"; Journal of Thermoplastic Compostie Materials; vol. 17; Issue 4; pp. 303-341; Jul. 2004 (39 pages).

Dell'Anna, Riccardo et al., "Lay-Up and Consolidation of a Composite Pipe by In Situ Ultrasonic Welding of a Thermoplastic Matrix Composite Tape"; MDPI Open Access Journals: Minerals; vol. 11, Issue 5: 786; pp. 1-11; May 11, 2018 (11 pages).

Ageorges, C., et al. "Advances in fusion bonding techniques for joining thermoplastic matrix composites: a review", Composites Part A: Applied Science and Manufacturing. Elsevier, vol. 32, No. 6. Jun. 1, 2001, pp. 839-857, [19 Pages].

Hou, Meng. "Thermoplastic Adhesive for Thermosetting Composites", Materials Science Forum vols. 706-709. Jan. 3, 2012, pp. 2968-2973, [7 Pages].

(56) References Cited

OTHER PUBLICATIONS

Nomura, H., et al. "Linear Vibration Welding of Polyethylene Pipes", In Proceedings of the 10th Plastic Pipes, Plastic Pipes Conference Association, Gothenburg, Sweden. Sep. 1998, pp. 669-678, [10 Pages].

Troughton, et al. "Linear Vibration Welding of Polyethylene Pipes", In Proceedings of the 10th Plastic Pipes, Plastic Pipes Conference Association, Gothenburg, Sweden. Sep. 1998, pp. 424-432, [9 Pages].

O. Schieler et al., "Induction Welding of Hybrid Thermoplastic-thermoset Composite Parts", KMUTNB Int J Appl Sci Technol., 2016, vol. 9, No. 1, pp. 27-36 (10 pages).

* cited by examiner

APPARATUS AND METHOD FOR FRICTION WELDING OF REINFORCED THERMOSETTING RESIN PIPE JOINTS

BACKGROUND OF INVENTION

RTR (Reinforced Thermosetting Resin) pipe is an acronym given to a broad family of fiber reinforced thermosetting pipes manufactured via a filament winding process. The reinforcement is generally glass fiber and the resin (matrix) is a thermoset polymer, traditionally polyester, vinyl-ester, or epoxy depending on the nature of the transported fluids in the pipe and the service temperature. This has led to the development of 3 main product lines for RTR pipes; GRP (Glass Reinforced Polyester), GRV (Glass Reinforced Vinylester) and GRE (Glass Reinforced Epoxy) pipes.

RTR pipes are generally produced in rigid segments of about 10-12 meters in length and transported onsite before being eventually assembled (jointed) to each other to the required length. The historical development of RTR began with the need to replace heavy concrete and steel pipes used in utilities and potable/sewage water systems. However, the use of RTR pipes in higher value applications such as oil and gas (O&G) service (particularly GRE), has gained a great deal of attention and acceptance. Currently, thousands of kilometers of RTR pipes are installed globally (particularly in the Middle East region) on yearly basis to meet the need of critical applications such as high pressure water injection and sour crude oil flowlines. The experience of O&G operators over the last decades has shown that RTR is a mature technology and can be an economical alternative to traditional carbon steel pipes, particularly in view of the fact that RTR pipe is not subject to the same corrosion seen in carbon steel piping. Depending on the manufacturer's product portfolio, RTR line pipes are generally available in diameters ranging from 1½" to 44" and can be designed to handle pressures ranging from 150 psi to 4000 psi and temperatures up to 210° F.

Within the RTR pipe manufacturing industry is well-known that the joint/connection in an RTR pipeline system is often the limiting component towards a higher temperature and pressure operating envelope. The envelope is often defined in terms of the product pressure in view of the diameter (i.e., larger diameter RTR pipe generally cannot handle the same pressure as smaller diameter piping). Indeed, the experience of O&G operators has shown that most failures/leaks in RTR pipe systems are associated with joint failures. This could potentially reduce the confidence in the material and technology.

A number of proprietary joint designs have been developed over the years by the manufacturers, which can generally be grouped into two main types/categories; adhesive/bonded joints and interference joints. The former, adhesive/bonded joints, relies on an adhesive (or a laminate in case of wrapped/laminated joints) to transfer the load from one pipe to another and the performance/limitation of such joints is often associated with proper surface preparation, particularly in field conditions. The latter, interference joints, relies on a solid contact and direct load transfer between the two RTR pipes to be jointed, such as threaded and key-lock joints. A combination of both techniques (i.e, adhesive and interference) is also possible (e.g., the Injected Mechanical Joint—IMJ).

In general, high-pressure RTR pipes make use of interference or mechanical joints (threaded or key-lock joints), while lower pressure ratings can be achieved with adhesive and laminate joints. Examples of interference joints are shown in FIG. 1A, which shows an integral threaded joint, FIG. 1B, which shows a coupled threaded joint, and FIG. 2, which shows a key-lock joint. Referring to FIG. 1A, the joint 100 is formed between a first RTR pipe 102 having a threaded spigot end and a second RTR pipe 104 having a threaded socket end. Referring to FIG. 1B, joint 110 is formed between a first RTR pipe 112 having a threaded spigot end and a second RTR pipe 114 also having a threaded spigot end by employing a coupler pipe 116 having threaded socket ends. Referring to FIG. 2, joint 200 is formed between an RTR pipe 202 having a spigot end and an RTR pipe 204 having a socket end using locking strips 206 and a rubber sealing (O-ring) 208.

SUMMARY OF INVENTION

One or more embodiments of the present invention relate to a system for coupling pipes comprising: a first pipe having a tapered, spigot end; a second pipe having a tapered, spigot end; wherein the first pipe and the second pipe are made from a reinforced thermosetting resin (RTR), a coupler having two tapered socket ends adapted to internally receive the respective tapered, spigot ends of the first pipe and the second pipe, wherein a thermoplastic material is disposed between an exterior of the first pipe and an interior of the coupler, wherein a thermoplastic material is disposed between an exterior of the second pipe and the interior of the coupler, wherein, upon application of rotational force to the coupler, friction between the first pipe, the second pipe, and the coupler generates heat sufficient to melt the thermoplastic material such that, when the heat is removed, the hardened thermoplastic material seals the first pipe and the second pipe to the coupler.

One or more embodiments of the present invention relate to a method of coupling a first pipe and a second pipe with a coupler, wherein the first pipe and the second pipe are made from a reinforced thermosetting resin (RTR) and each have a tapered, spigot end, wherein the coupler has two tapered socket ends adapted to internally receive the respective tapered, spigot ends of the first pipe and the second pipe, the method comprising: disposing a thermoplastic material between an exterior of the first pipe and an interior of the coupler; disposing a thermoplastic material between an exterior of the second and an interior of the coupler; inserting the first pipe and the second pipe into the coupler; and applying a rotational force to the coupler such that friction between the first pipe, the second pipe, and the coupler generates heat sufficient to melt the thermoplastic material such that, when the heat is removed, the hardened thermoplastic material seals the first pipe and the second pipe to the coupler.

Other aspects and advantages of the invention will be apparent from the following description and the appended claims.

DETAILED DESCRIPTION

Threaded joints are traditionally used for high pressure RTR pipes. These can be either "integral" (i.e., a connection that does not use a joining member/coupler to transfer the load from one pipe to the other) or using a "coupler." Although threaded joints can achieve outstanding performance, in terms pressure rating and sealing capacity, the experience of O&G operators has shown that failures can happen. The general opinion is that the failures are associated with improper installation by the jointers (pipe misalignment, over-torqueing, improper/insufficient taping of the thread compound—TEFLON® (a trademark of the The Chemours Company FC, LLC), etc.).

Figure 1A:
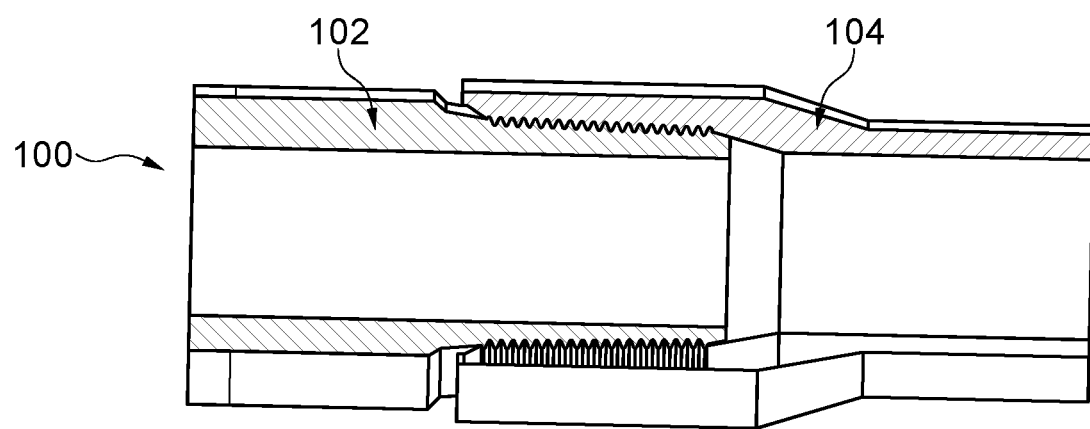
FIGS. 1A and 1B show an integral and a coupled threaded joint, respectively.
Figure 1B:
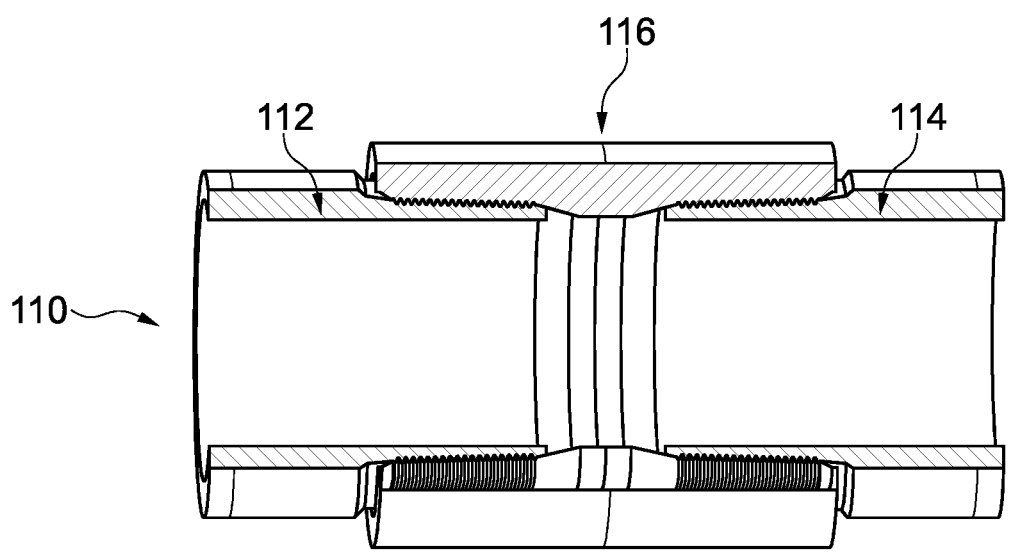
Figure 2:
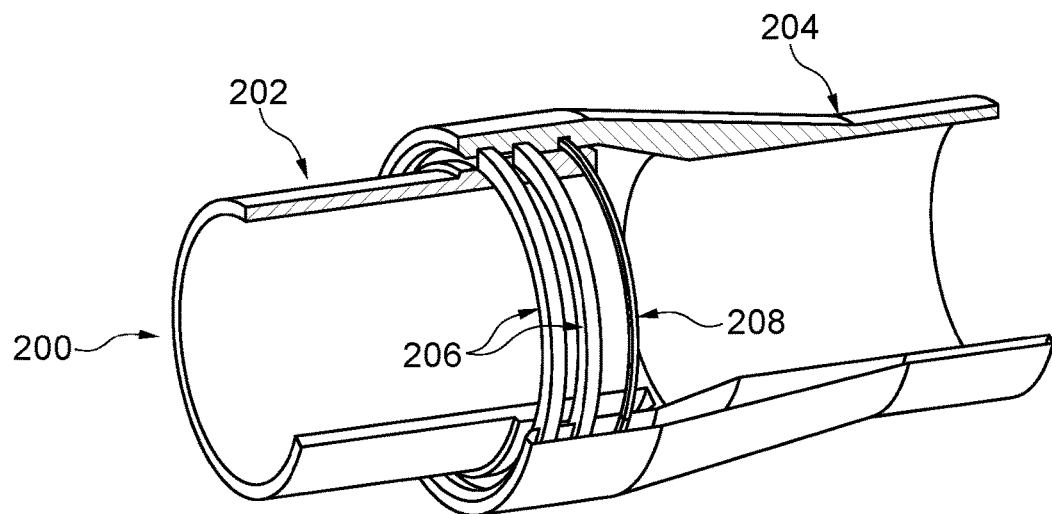
FIG. 2 shows a key-lock joint.
Figure 3:
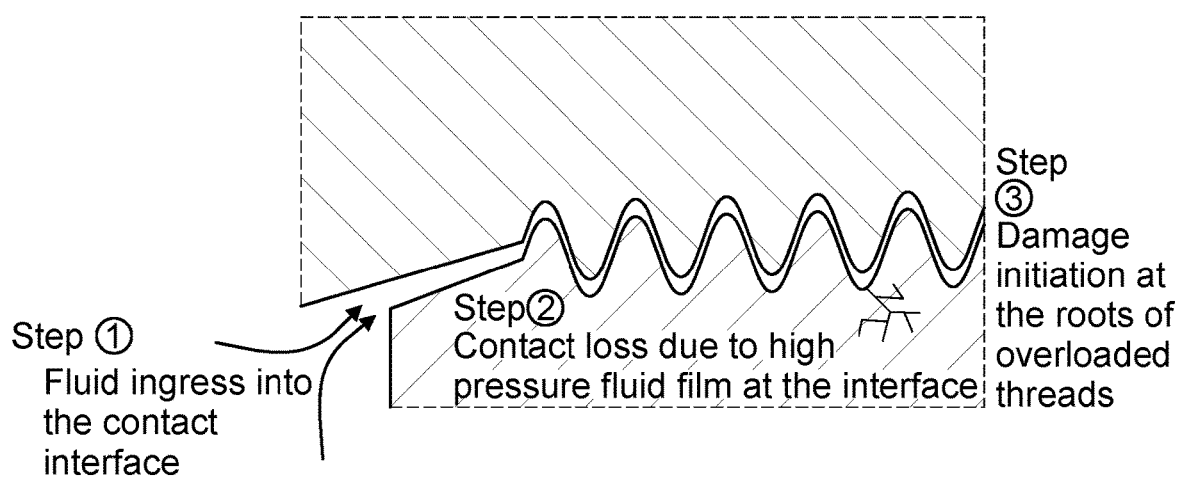
FIG. 3 shows a schematic representation of overloading failure of threaded RTR connections.

A typical failure mechanism is illustrated in FIG. 3. A poor installation can result in imperfections/cavities along the contact surface between the spigot and the socket. In operation, fluid (e.g., water) at high pressure and high temperature could ingress into these cavities (step #1) and create a high pressure fluid film (step #2) which would slowly propagate along the spigot-socket interface. In some cases, the creep of the resin at the interface can aggravate the water propagation at the interface. As the ingress progresses, the contact pressure on the initial threads is eliminated and the excess load is transferred to the nearby threads, which eventually leads to overloading failure (step #3).

One or more embodiments of the present invention introduce a new jointing technique that will reduce, and potentially eliminate, failures and increase the confidence in the RTR pipe technology. The ultimate target for such embodiments is to replace current jointing technologies for RTR pipes (low and high pressure) with a maximum operating envelope up to 24" at 1500 psi pressure rating and service temperatures above 200° F.

Therefore, one or more embodiments of the present invention relate to a system and method for jointing of high pressure reinforced thermosetting resin (RTR) pipes using a friction welding process. More specifically, one or more embodiments relate to a system and method for advanced coupling and sealing of high pressure reinforced thermosetting resin (RTR) pipes. The system comprises: (1) two "weldable" RTR pipes with tapered spigot ends coated with a tie layer (interlayer) comprising at least a thermoplastic material and (2) a "weldable" RTR coupler with tapered socket ends coated with a tie layer comprising at least a thermoplastic material, or alternatively a reinforced thermoplastic coupler. Additionally, a method of jointing/coupling the two RTR pipes includes: (1) pushing the two RTR pipes into the tapered reinforced coupler (to ensure the tie layers are compressed against each other) followed by (2) linear friction welding (LFW) of the two pipes to the coupler through rotation or oscillation of the coupler around the RTR pipes.

Figure 4:
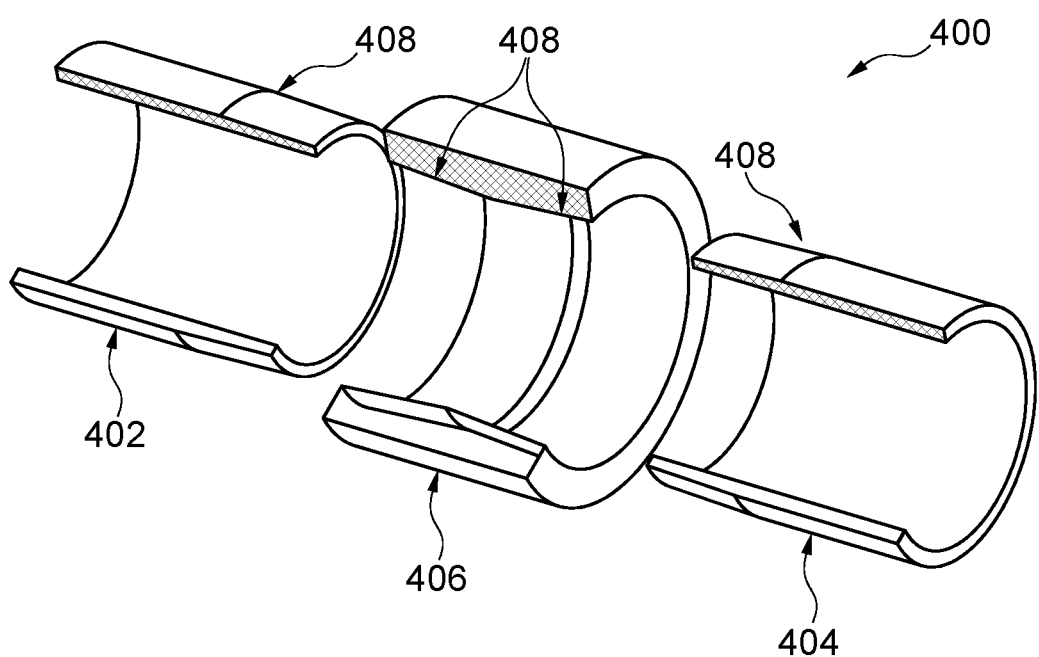
FIG. 4 is a schematic 3D representation of the RTR jointing system in accordance with an embodiment of the present invention.
Figure 5:
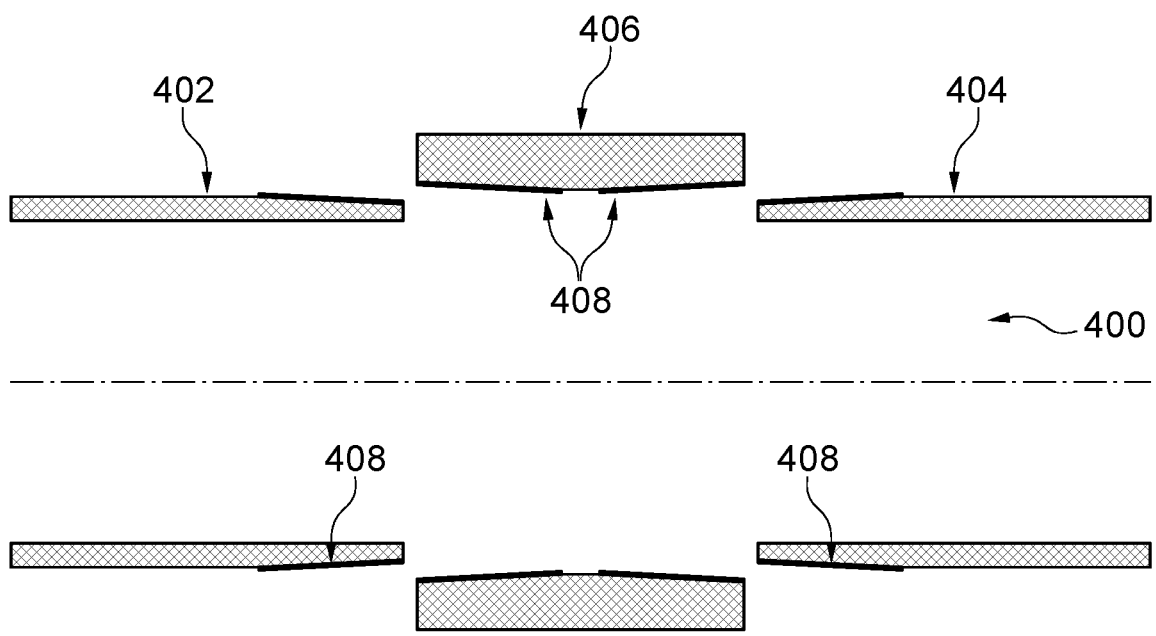
FIG. 5 is a schematic cross-section representation of the RTR jointing system in accordance with an embodiment of the present invention.

An exemplary system in accordance with one or more embodiments is schematically presented in FIG. 4 and FIG. 5. As can be seen, a joint 400 is being formed between a first RTR pipe 402 with a tapered spigot portion (end) coated with a tie layer comprising at least a thermoplastic material (tie layer A) 408 and a second RTR pipe with a tapered spigot portion (end) coated with a tie layer comprising at least a thermoplastic material (tie layer A) 408 by employing a reinforced thermoset (RTR) coupler pipe 406 with a tapered socket portions (ends) coated with a tie layer comprising at least a thermoplastic material (tie layer B) 408.

The main role of the tie layers (A and B) is to make the thermoset parts "weldable" and, therefore, enable the permanent interlock of the spigots to the coupler. On top of that, the thermoplastic interlayers (or tie layers) will provide the required sealing to the joint upon completion and will eliminate the need for a secondary sealing system, such as O-rings. The axial length of the bonding line (i.e., the length of the coupler) must be large enough to provide the required joint strength (a larger coupler length gives a larger surface area to transfer the load and increases the overall strength, as defined by the load bearing capacity of the joint).

Those skilled in the art will appreciate various methods can be used to apply and bond the tie layers to the thermoset parts. Several techniques, such as thermal spraying a thermoplastic powder on the faying surface of the thermoset parts (with sufficient surface preparation, e.g., sand blasting) or applying a thermoplastic implant while the thermoset is in a partially cured (or uncured) state, followed by co-curing at the required temperature (below the melting temperature of the thermoplastic) may be employed in different embodiments. In one or more embodiments, the deposition of tie layers may be conducted in the factory at the manufacturing stage. Because the surface preparation of a substrate often conditions the final quality of a coating, a clean and controlled environment (e.g., dust free, temperature regulation, etc.) is advantageous, which is easier to achieve in the manufacturing site.

The thermoplastic materials used on the tie layers can either be the same or different in A and B, but must necessarily be weldable to each other (e.g., have very close melting/solidification temperatures and be melt compatible, i.e., mix well when molten). In addition, such thermoplastic materials must be carefully selected to ensure their function throughout the lifetime of the pipe (typically, 25 years). For example, the materials must be qualified (e.g., as per ISO 23936) to meet the service specifications in terms of design temperature, pressure and chemical compatibility with the environment (acidic gases, liquids, aromatics contents, etc.). Examples of thermoplastics that can be considered, include but are not limited to (i.e., non-exhaustive list), are HDPE, PE-RT, PVDF, PEEK, PEKK, PA12, POK among other thermoplastic resins commonly used in the O&G industry.

In one or more embodiments, a variant to the system described earlier is illustrated in FIG. 6. A joint 600 is formed between RTR pipes 602, 604 and the coupler pipe 606, in which the coupler pipe 606 is made of a reinforced thermoplastic material. Such a configuration eliminates the need for a thermoplastic tie layer (tie layer B) inside the coupler 606. In one aspect, this configuration could be easier to adopt because reinforced thermoplastic couplers are readily available (although, in another aspect, an RTR coupler 606 is likely to be a more cost effective, but at the expense of an additional step to make the coupler "weldable"). The particular coupler material used can be selected according to two main criteria: (1) proper weldability to the thermoplastic material used in tie layer A, and (2) meeting the minimum required long term performance of the joint (strength, stiffness, chemical resistance and permeation barrier).

Those skilled in the art will appreciate that the exemplary embodiments disclosed are merely schematic illustrations and that many other variations may be made in design or geometry without departing from the scope of the present invention. In particular, although the figures show that the thermoplastic tie layer inside the RTR coupler is broken into two individual tie layers (one on each taper end), a single tie layer extending from one end to the other may be used in one or more embodiments. Such a configuration would be practical to manufacture and may provide additional fluid permeation barrier to the RTR coupler.

As schematically illustrated in FIGS. 7A-7C, in another potential variation, a single "thick" thermoplastic inter-layer 708 may be used on one face of the joint 700 only (i.e, either the RTR pipe 702, 704 side or on the coupler 706 side), leaving the other side uncoated. Provided that sufficient surface preparation is performed on the uncoated RTR pipe 702, 704 joining (e.g., abrasion), the joining process described below will lead the thermoplastic interlayer to fuse and bond (physically and/or chemically) to the uncoated RTR part. Although this variant eliminates the requirement for coating both sides of the RTR joint 700, which can be challenging in some circumstances, embodiments employing such a variation may negatively affect performance in terms of bonding strength.

A method of assembling any of the systems described above is illustrated in FIG. 8. As those of skill in the art will appreciate, the same procedure can be followed for any of the system variants presented. The assembly method involves a conventional linear friction welding process, which will not be described in detail herein.

Referring to FIG. 8, upon taking sufficient precautions at the installation site to make sure that the two RTR pipes are properly aligned (Step 1), the pipes are pushed into the reinforced coupler to bring the thermoplastic layers into contact with each other (Step 2). The pipe and coupler ends must have enough geometry (here "tapered" as an example) to allow sufficient contact (compression) between the thermoplastic interlayers and the coupler and maintain continuous friction throughout the joining process. Therefore, it is preferable to maintain an axial load/force on the pipes during the joining process. The last step (Step 3) consists of rotating or oscillating the reinforced coupler around the RTR pipes to generate enough heat by friction to weld the RTR pipes to the coupler. This welding process is commonly known as linear friction welding (LFW), albeit the contact surface is here curved.

Following a controlled cooling (that could be required to achieve a given crystallinity in the thermoplastic layer) and full solidification, the RTR pipes are joined and also sealed. The thermoplastic interlayer will act as a (1) load transfer from one pipe to the other, but also (2) as a barrier to prevent any permeation and/or leak of the transported fluids. This eliminates the need for secondary sealing mechanism, such as O-rings.

It is worth noting that the tie layer will mainly be subject to axial load/stresses during pipe operation (hoop stresses are carried mainly by the RTR pipes and the reinforced coupler). Therefore, the length of the reinforced coupler (i.e., the total contact surface between the coupler and the pipes) must properly designed (i.e., large enough) to ensure the shear load on the thermoplastic interlayers does not exceed their capacity. The latter being mainly dependent on the shear strength of the thermoplastic material used and to the bonding strength between the tie layers and the RTR parts.

One or more embodiments of the present invention as described above may solve one or more of the following problems or provide one or more of the following advantages.

The systems described herein are advantageous because it is known that the integrity of conventional RTR joints (threaded or adhesive joints) is highly dependent on the skills of the jointer during installation. For example, a joint misalignment, improper application of TEFLON® compound on the threads or excessive torqueing during the joint installation will inevitably impact the interference (contact) pressure between the spigot and socket threads. Further, the degradation of the sealing systems (secondary O-rings) used in some of the joints (e.g., key lock) are known to be the main source of leaks. Thus, the alternative way of joining RTR pipes through a welding process as is described herein simplifies the process and avoids such problems. Also, friction welding is an efficient and effective joining solution for continuous fiber reinforced polymer pipes.

One or more embodiments may provide improved sealing and reliability over prior systems. The sealing is entirely provided by the thermoplastic tie layers after welding. In conventional joints, the sealing is provided by a contact pressure (O-ring for key lock-joints or TEFLON® wrap in threaded joints). The contact pressure degrades over time and joints end up leaking. In embodiments of the present invention, the sealing is permanent (welded). In addition, the effective joining area is larger and thus the permeation path is longer, resulting in a lower long term leak of harmful substances to the environment.

One or more embodiments may provide increased joint strength provided by a larger joining area (i.e., the length of the coupler) and controlled mainly by the strong bonding between the thermoplastic interlayer to thermoset parts.

One or more embodiments may allow for de-skilled installation, as compared to conventional joints, where the quality of the joints often depends on the skills of the jointer (surface treatment, injection of resin, proper application of TEFLON® sealing compound on-site, installation of O-ring, torqueing, etc.). In embodiments of the present invention, the application of the tie layers at the pipe ends can be done at the manufacturing site (controlled production) and the skills required by the jointer at the installation site are reduced. Also, the friction welding process can be automated.

One or more embodiments provide versatility. With the potential to easily change the joint design and performance, even on-site, through modification of the pipe end taper geometry. Embodiments of the present invention make the joint easily repairable on-site (thermoplastic welding is a reversible process unlike thermoset curing). In addition, embodiments of the present invention can be possibly used as a repair technique on straight sections of RTR pipes. The latter must be modified on-site to incorporate the connecting coupler and the thermoplastic interlayers.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system for coupling pipes comprising:
a first pipe having a tapered, spigot end;
a second pipe having a tapered, spigot end;
wherein the first pipe and the second pipe are made from a reinforced thermosetting resin (RTR),
a coupler having two tapered socket ends adapted to internally receive the respective tapered, spigot ends of the first pipe and the second pipe, wherein the coupler is made from a reinforced thermoplastic material,
wherein a thermoplastic material is disposed between an exterior of the first pipe and an interior of the coupler, wherein a thermoplastic material is disposed between an exterior of the second pipe and the interior of the coupler, wherein, upon application of rotational force to the coupler, friction between the first pipe, the second pipe, and the coupler generates heat sufficient to melt the thermoplastic material such that, when the heat is removed, the hardened thermoplastic material seals the first pipe and the second pipe to the coupler.

2. The system of claim 1, wherein at least one of the first pipe, the second pipe, and the coupler is coated with a thermoplastic tie layer.

3. The system of claim 1, wherein all of the first pipe, the second pipe, and the coupler are coated with a thermoplastic tie layer.

4. The system of claim 1, wherein the entirety of the interior of the coupler is coated with a thermoplastic tie layer.

5. A method of coupling a first pipe and a second pipe with a coupler, wherein the first pipe and the second pipe are made from a reinforced thermosetting resin (RTR) and each have a tapered, spigot end, wherein the coupler has two tapered socket ends adapted to internally receive the respective tapered, spigot ends of the first pipe and the second pipe, wherein the coupler is made from a reinforced thermoplastic material, the method comprising:

disposing a thermoplastic material between an exterior of the first pipe and an interior of the coupler;

disposing a thermoplastic material between an exterior of the second and an interior of the coupler;

inserting the first pipe and the second pipe into the coupler; and applying a rotational force to the coupler such that friction between the first pipe, the second pipe, and the coupler generates heat sufficient to melt the thermoplastic material such that, when the heat is removed, the hardened thermoplastic material seals the first pipe and the second pipe to the coupler.

6. The method of claim 5 further comprising: coating at least one of the first pipe, the second pipe, and the coupler with a thermoplastic tie layer.

7. The method of claim 5 further comprising: coating all of the first pipe, the second pipe, and the coupler with a thermoplastic tie layer.

8. The method of claim 5 further comprising: coating an entirety of the interior of the coupler with a thermoplastic tie layer.

* * * * *